J. A. BECKER.
EGG BREAKER.
APPLICATION FILED OCT. 27, 1920.

1,365,961.

Patented Jan. 18, 1921.

INVENTOR
J. A. Becker
BY
Adam E. Fisher
ATTORNEY

UNITED STATES PATENT OFFICE.

JOHN A. BECKER, OF NAMPA, IDAHO.

EGG-BREAKER.

1,365,961. Specification of Letters Patent. Patented Jan. 18, 1921.

Application filed October 27, 1920. Serial No. 419,884.

*To all whom it may concern:*

Be it known that I, JOHN A. BECKER, a citizen of the United States, residing in the city of Nampa and State of Idaho, have invented new and useful Improvements in Egg-Breakers, of which the following is a specification, reference being had to the accompanying drawings.

This invention pertains to egg breaking devices, and the object is to provide a simple and efficient tool for this purpose for use in the kitchen or elsewhere, where many eggs are used in cooking, or for other purposes.

In the drawings—

Figure 1:
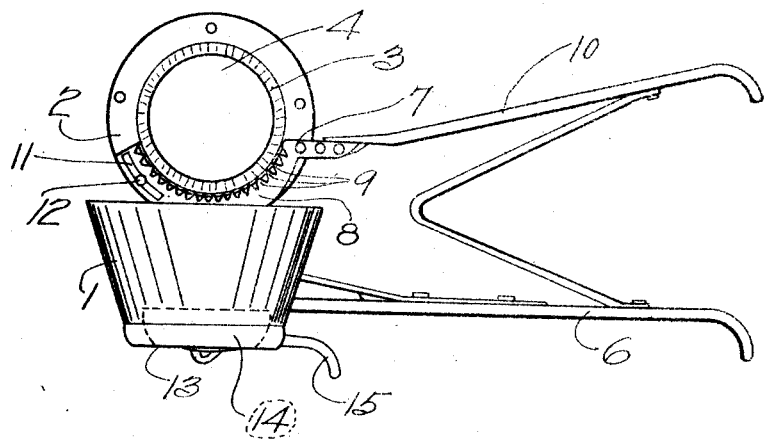
Figure 1 is a frontal elevation.
Figure 2:
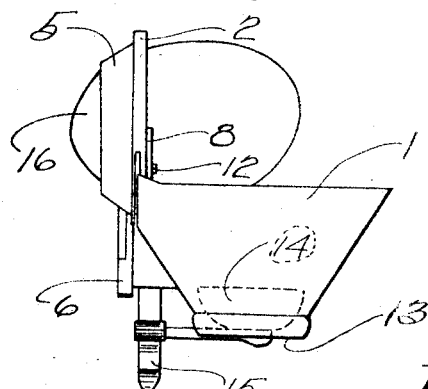
Fig. 2 is an end view, including an egg in position ready for breaking.
Figure 3:
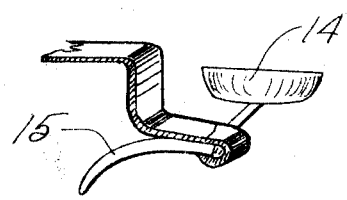
Fig. 3 is a detail of the release valve in the bottom of the cup, for separating the yolk of the egg from the white.

The invention consists of a suitable small receiving cup 1, and vertically mounted at one side thereof, the egg breaker 2. This breaker is made up of an outer egg ring 3 having the circular opening 4 immediately above the cup 1, the concave back 5 and the laterally extended handle 6. In front of the egg ring 3 and pivoted thereto at one side as at 7, is the curved breaker blade 8 with a plurality of teeth 9. This blade 8 curves around the under side of the opening 4, and likewise has a laterally extended handle 10 to coöperate with the handle 6. A slot 11 is cut through the blade 8 at the point opposite to the pivotal point 7, and a headed pin 12 is set through the slot 11 and into the adjacent side of the egg ring 3, thus allowing a certain degree of movement to the toothed blade 8. An opening 13 may be cut through the bottom of the cup 1, and a spring valve 14 mounted therein and controlled by a trigger 15.

In operation, the small end of the egg 13 is inserted into the egg ring 3 where it is held with the left hand. By the right hand the handles 6 and 10 are then pressed together, causing the teeth 9 to cut through the shell of the egg at the under side. Then the outer end of the egg is raised, thus opening the egg and causing the white and yolk to fall into the cup 1. To separate the yolk from the white, the trigger 15 is pressed, thus opening the valve 14 and allowing the white to run out.

While I have herein described a certain specific method of constructing and assembling the elements of my invention, it is understood that same may be varied in minor details, not departing from the spirit of my invention, as defined in the appended claims.

I claim:

1. An egg breaker, comprising a receiving cup; an egg ring mounted vertically at one side thereof and adapted to receive one end of the egg; a handle extended laterally from said ring; a curved breaker blade pivoted from one end to one side of the front face of the egg ring and positioned adjacent the lower side of the ring; and a handle extended from said breaker blade adjacent to the handle of the egg ring.

2. An egg breaker, comprising a receiving cup; an egg ring mounted vertically at one side thereof to receive one end of the egg; a handle extended from said ring; a toothed breaker blade pivoted from one end to one side of the egg ring, across the lower side of the ring; and a handle extended from said blade adjacent the other handle.

JOHN A. BECKER.

Witnesses:
E. R. BRACE,
H. S. THOMAS.